US007677379B2

(12) United States Patent
Nago et al.

(10) Patent No.: US 7,677,379 B2
(45) **Date of Patent: *Mar. 16, 2010**

(54) OPTICAL SENSING DEVICE FOR DETECTING OPTICAL FEATURES OF VALUABLE PAPERS

(75) Inventors: Tokimi Nago, Sagamihara (JP); Toru Seki, Sagamihara (JP); Kazuhiko Okamoto, Sagamihara (JP)

(73) Assignee: Japan Cash Machine Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/649,590

(22) Filed: Jan. 3, 2007

(65) Prior Publication Data

US 2007/0108012 A1 May 17, 2007

Related U.S. Application Data

(63) Continuation of application No. 10/747,825, filed on Dec. 29, 2003, now Pat. No. 7,182,197.

(30) Foreign Application Priority Data

Dec. 27, 2002 (JP) ............................ 2002-380833

(51) Int. Cl.
*G06K 7/12* (2006.01)
*G07D 7/12* (2006.01)

(52) U.S. Cl. ................................. 194/207; 250/559.11

(58) Field of Classification Search ................. 194/207; 235/439, 440, 454, 469, 470; 356/310; 250/559.11

See application file for complete search history.

(56) References Cited

U.S. PATENT DOCUMENTS 4,204,765 A * 5/1980 Iannadrea et al. ............. 356/71

(Continued)

FOREIGN PATENT DOCUMENTS

EP 1.096.441 A2 * 5/2001

(Continued)

OTHER PUBLICATIONS

Canadian Office Action for CA2,646,498 dated Sep. 17, 2009.

(Continued)

*Primary Examiner*—Patrick Mackey
*Assistant Examiner*—Mark Beauchaine
(74) *Attorney, Agent, or Firm*—Bachman & LaPointe, P.C.

(57) ABSTRACT

An optical sensing device for detecting plural optical features of valuable papers is provided that comprises first and second photocoupers 5 and 6 or 9 and 10 positioned in the vicinity of and on the opposite sides of a passageway 13 for guiding the valuable paper 64. Each of first and second photocouplers 5 and 6 or 9 and 10 has a light emitting element 20, 22, 30, 32 for emitting a light, and a light receiving element 21, 23, 31, 33 for selectively receiving the light from the light emitting element 20 so that each light receiving element 21, 23, 31, 33 can receive lights reflected on and penetrating the valuable paper 64 for detection of multiple optical features from the valuable paper 64. Thus, the optical sensing device can derive plural optical scanning patterns by means of less number of light emitting and receiving elements to improve accuracy in valuable paper validation; can pick out optical patterns for different colors printed on valuable paper by means of plural lights of different wavelength irradiated on a same scan line or area on valuable paper; and can utilize inexpensive light emitting and receiving elements to reduce cost for manufacture.

17 Claims, 9 Drawing Sheets

U.S. PATENT DOCUMENTS

| | | | | |
|---|---|---|---|---|
| 4,413,718 | A * | 11/1983 | Dean | 194/344 |
| 5,304,813 | A * | 4/1994 | De Man | 250/556 |
| 5,498,879 | A * | 3/1996 | De Man | 250/556 |
| 5,666,417 | A | 9/1997 | Liang et al. | |
| 5,764,346 | A | 6/1998 | Jard et al. | |
| 5,903,339 | A * | 5/1999 | Levasseur | 356/71 |
| 5,923,413 | A | 7/1999 | Laskowski | |
| 6,101,266 | A | 8/2000 | Laskowski et al. | |
| 6,457,586 | B2 * | 10/2002 | Yasuda et al. | 209/534 |
| 6,486,464 | B1 | 11/2002 | Ma et al. | |
| 7,167,247 | B2 | 1/2007 | Uemura et al. | |
| 7,182,197 | B2 * | 2/2007 | Nago et al. | 194/207 |
| 7,242,796 | B2 * | 7/2007 | Matsui et al. | 382/135 |
| 7,337,889 | B2 | 3/2008 | Tamamoto et al. | |
| 2002/0049674 | A1 | 4/2002 | Tamamoto et al. | |

FOREIGN PATENT DOCUMENTS

| | | | | |
|---|---|---|---|---|
| EP | 1321904 | | | 6/2003 |
| EP | 1357522 | A2 | | 10/2003 |
| GB | 1470737 | | | 7/1975 |
| GB | 2355522 | A | | 4/2001 |
| JP | 3037946 | | * | 3/1997 |
| JP | 3037946 | A | * | 3/1997 |
| WO | 01/37226 | A1 | | 5/2001 |

OTHER PUBLICATIONS

Opposition against EP1 576 549 B1 (03768359.6) dated Oct. 29, 2009.

* cited by examiner

OPTICAL SENSING DEVICE FOR DETECTING OPTICAL FEATURES OF VALUABLE PAPERS

CROSS REFERENCE TO RELATED APPLICATIONS

This application is a U.S. Continuation application of U.S. Ser. No. 10/747,825 filed Dec. 29, 2003 now U.S. Pat. No. 7,182,197 which claims priority of Japanese Patent Application No. 2002-380833 filed Dec. 27, 2002.

TECHNICAL FIELD

The present invention relates to an optical sensing device, in particular, for detecting plural optical features of valuable papers such as bills by means of plural lights reflected on or penetrating the valuable paper to improve validation performance of the valuable paper.

BACKGROUND OF THE INVENTION

For example, Japanese Patent Disclosure No. 62-111376 discloses a system for optically validating bills by means of a single light emitting element that has two light emitting diode chips therein to simultaneously radiate visible and infrared rays to reduce the number of light emitting elements that have been utilized in a prior art system to independently radiate visible and infrared rays from these light emitting elements.

In another aspect, Japanese Patent Publication No. 54-26400 presents a currency validation device for testing a reflectance or transmittance ratio of visible ray to infrared ray in a predetermined range. This device comprises light sources or light emitting diodes for producing visible and infrared rays, a light receiving element for receiving each light from these light sources, a comparator for detecting a ratio of emission levels from two light sources, and a controller for adjusting an emission amount from one of two light sources to always obtain a constant ratio from the comparator. In this arrangement, one light emitting diode is freely turned on with a constant current flow without any restriction, and the other light emitting diode is turned on at a constant ratio of the emission levels to retain the ratio of light amounts between visible and infrared rays, and advantageously there is no need for keeping the absolute levels of visible and infrared rays at constant values.

In some cases, however, the discriminator could not correctly validate bills due to insufficient amount of different optical features taken out of bills. Also, as usual optical sensors utilize a photocouper of combined light emitting and receiving elements, increased number of optical sensors for improvement of validation accuracy occupies a wider area in the discriminator, resulting in larger size of sensor structure and obstruction to optical scanning of a target area on bills.

Accordingly, an object of the present invention is to provide an optical sensing device for detecting plural optical features of valuable papers with an improved validation performance. Another object of the present invention is to provide an optical sensing device of small or compact size for detecting plural optical features of valuable papers. Still another object of the present invention is to provide an optical sensing device that can derive plural optical scanning patterns by means of less number of light emitting and receiving elements to improve accuracy in bill validation. A further object of the present invention is to provide an optical sensing device that can pick out optical patterns for different colors printed on valuable paper by means of plural lights of different wavelength irradiated on a same scan line or area on valuable papers. A still further object of the present invention is to provide an optical sensing device that can utilize inexpensive light emitting and receiving elements to reduce cost for manufacture.

SUMMARY OF THE INVENTION

The optical sensing device for detecting plural optical features of valuable papers according to the present invention, comprises first and second photocoupers (5 and 6 or 9 and 10) positioned in the vicinity of and on the opposite sides of a passageway (13) for guiding the valuable paper. Each of the first and second photocouplers (5 and 6 or 9 and 10) has a light emitting element (20, 22, 30, 32) for emitting a light, and a light receiving element (21, 23, 31, 33) in the proximity to the light emitting element (20, 22, 30, 32) for selectively receiving the light from the light emitting elements (20, 22, 30, 32) so that each light receiving element (21, 23, 31, 33) can receive lights reflected on and penetrating the valuable paper for detection of multiple optical features from the valuable paper; can derive plural optical scanning patterns by means of less number of light emitting and receiving elements to improve accuracy in valuable paper validation; can take optical patterns for different colors printed on valuable paper by means of plural lights of different wavelength irradiated on a same scan line or area of valuable paper; and can utilize inexpensive light emitting and receiving elements to reduce cost for manufacture.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Figure 1:
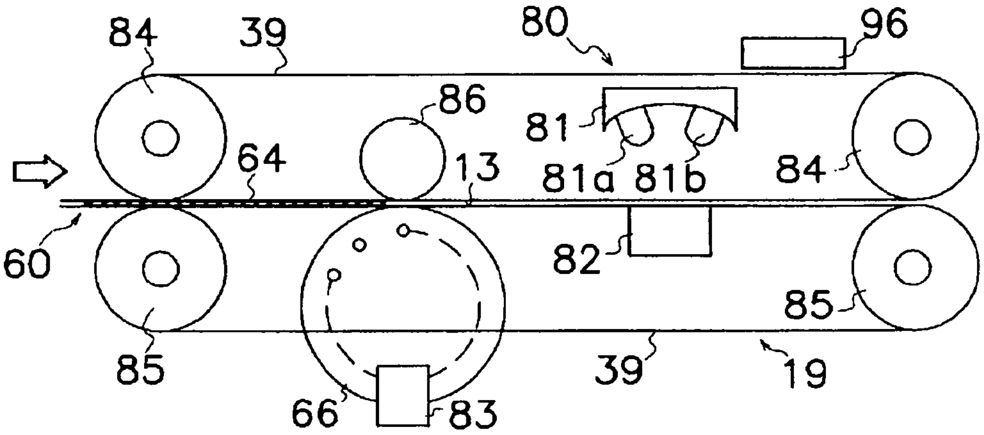
FIG.1 PRIOR ART
FIG. 1 is a sectional view of a prior art bill validator.

FIG. 1 demonstrates a prior art bill discriminator that comprises a conveyor 19 provided with a pair of convey belts 39 for holding therebetween and transporting a bill 64 inserted into an inlet 60 along a passageway 13. A sensor 80 mounted in the proximity to passageway 13 includes a light emitter 81 and a light receiver 82 disposed on the opposite sides of passageway 13. Light emitter 81 has first and second light emitting elements 81*a* and 81*b* for producing two kinds of lights of different wavelength, for example, red light and infrared ray. First and second light emitting elements 81*a* and 81*b* are disposed on the lean to direct lights from light emitting elements 81*a* and 81*b* to a substantially same area on bill 64. Conveyor 19 comprises a convey motor 66 for driving convey belts 39, a pair of upper pulleys 84 and a pair of lower pulleys 85 synchronously operated to hold bill 64 between convey belts 39 and transporting it, and a pulse generator 83 for producing synchronized pulses with rotation of convey motor 66. A pinch roller 86 is pressed on bill 64 and rotated to move it along passageway 13. Light receiver 82 and pulse generator 83 are electrically connected to input terminals of a discrimination control device 96 whose output terminals are electrically connected to convey motor 66 and light emitter 81.

In operation, bill 64 is inserted into inlet 60, and convey motor 66 is rotated to drive upper and lower pulleys 84, 85 and thereby transport bill 64 by convey belts 39. Here, pulse generator 83 outputs pulses in synchronization with rotation of convey motor 66 so that discrimination control device 96 forwards outputs to alternately turn on first and second light emitting elements 81*a*, 81*b* in response to synchronized pulses received by discrimination control device 96, and therefore, red light and infrared ray are irradiated on bill 64. Thus, such a prior art bill discriminator detects optical features of bill by radiation of two lights of different wavelength to validate bill. However, the bill discriminator cannot correctly validate bills due to insufficient amount of different optical features taken out of bills. A bill validator of this kind is shown for example in Japanese Utility Model Disclosure No. 58-32562.

Figure 2:
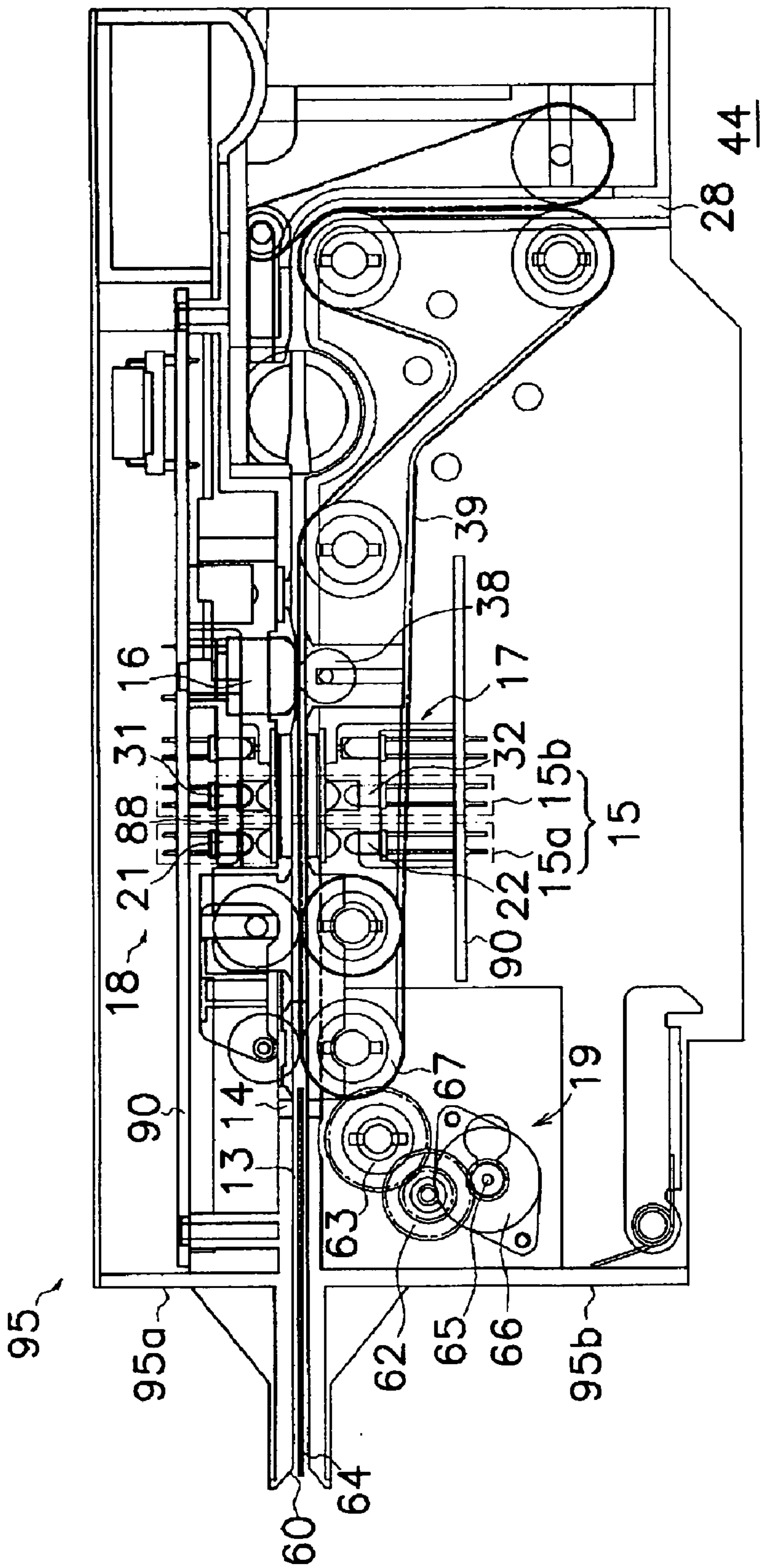
FIG. 2 is a sectional view of a bill validator with an optical sensing device according to the present invention.
Figure 3:
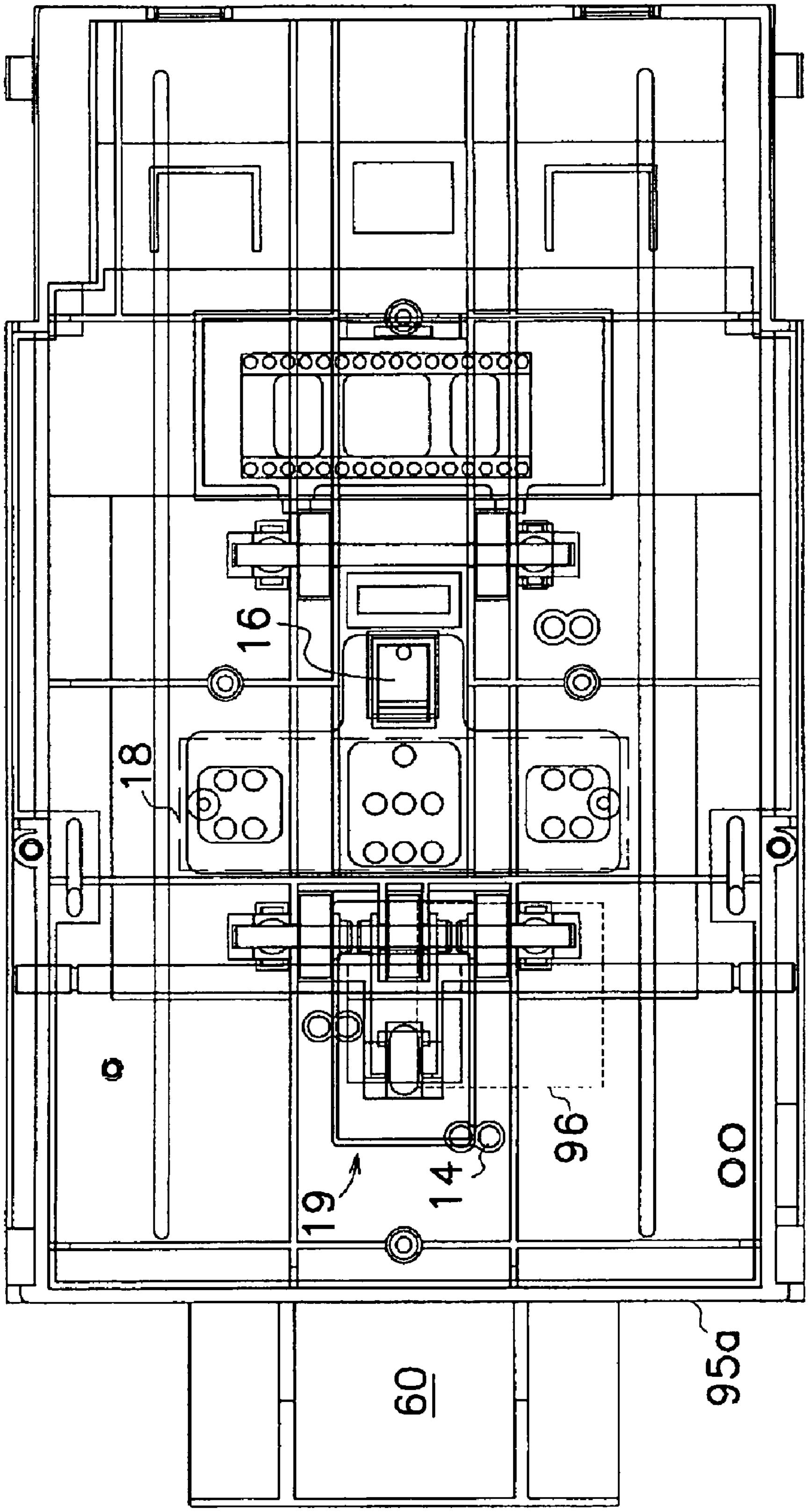
FIG. 3 is a plan view of an upper frame of the bill validator shown in FIG. 2.
Figure 4:
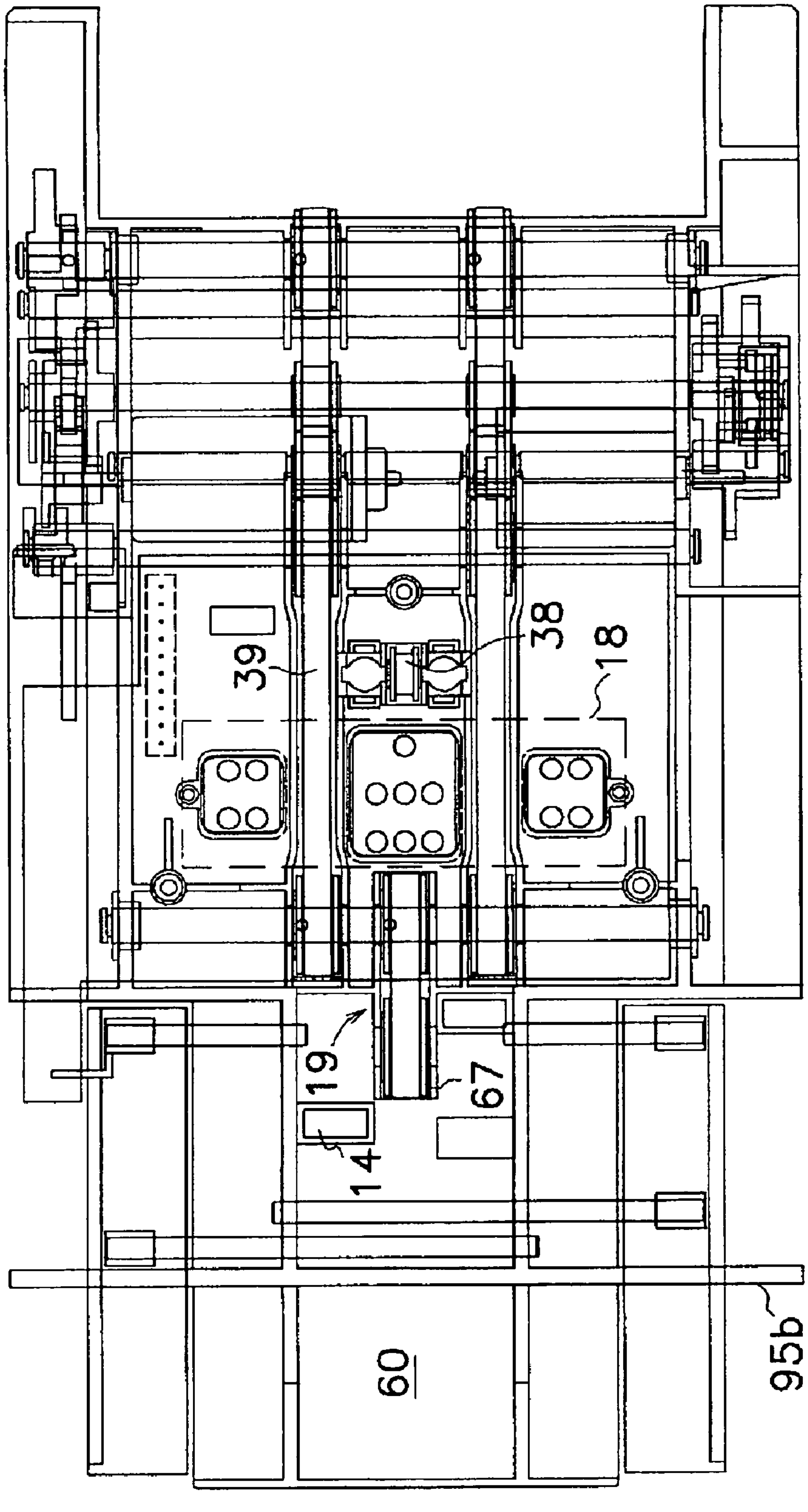
FIG. 4 is a plan view of a lower frame of the bill validator shown in FIG. 2.

Embodiments of the optical sensing device according to the present invention are described hereinafter in connection with FIGS. 2 to 14. As shown in FIG. 2, a bill validator with the optical sensing device according to the present invention comprises a conveyor 19 for transporting a bill 64 inserted into an inlet 60 along a passageway 13, a sensing device 18 for detecting optical and magnetic features of moving bill 64 along passageway 13, and a control device 96 for receiving outputs from sensing device 18 to validate bill 64 and forward drive signals to conveyor 19. A frame 95 comprises upper and lower framing members 95*a*, 95*b* made of metallic panels to accommodate conveyor 19, sensing device 18 and control device 96 therein.

As illustrated in FIG. 2, conveyor 19 comprises a convey motor 66, a pinion 65 mounted on an output shaft of convey motor 66, a first gear 62 meshed with pinion 65, a second gear 63 mated with first gear 62, convey rollers 67 driven by second gear 63 and convey belts 39 wound around convey rollers 67 for holding and transporting bill 64 along passageway 13. Rotated in synchronization with rotation of convey motor 66 is a rotary encoder (not shown) which produces pulse signals to control device 96.

Sensing device 18 comprises an optical sensing device 15 for detecting optical features of bill 64 to produce detection signals, a magnetic sensing device 16 for detecting ferrous ink printed on a predetermined position of bill 64 to produce detection signals, and an inlet sensor 14 for detecting insertion of bill 64 into inlet 60. Inlet sensor 14 shown in FIGS. 2 and 8 comprises a photocoupler of a light emitting diode and a light receiving transistor. Optical sensing device 15 comprises a front sensing assembly 15*a* disposed on the side of inlet 60 along passageway 13, a rear sensing assembly 15*b* disposed in a spaced relation to and behind front sensing assembly 15*a* and a thread sensor 17 disposed behind rear sensing assembly 15*b* for detecting a thread for use in unauthorized withdrawal of bill 64. A pinch roller 38 is disposed opposite to magnetic sensing device 16 to urge moving bill 64 on magnetic sensing device 16.

Figure 5:
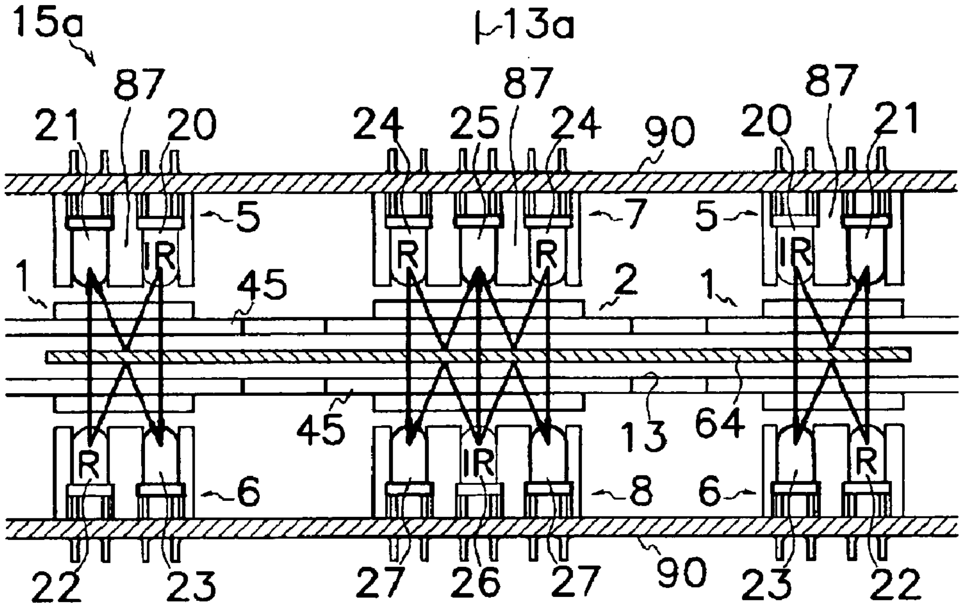
FIG. 5 is a sectional view showing front assemblies of the optical sensing device.

As shown in FIG. 5, front sensing assembly 15*a* comprises a pair of outer sensing assemblies 1, and an inner sensing assembly 2 positioned laterally away from and between outer sensing assemblies 1. Each outer sensing assembly 1 comprises a first photocouper 5 and a second photocoupler 6 positioned in the vicinity of and on the opposite sides of passageway 13 and in vertically spaced relation to each other across passageway 13. First photocoupler 5 has a first light emitting element 20 for emitting a first light of first wavelength and a first light receiving element 21 adjacent to first light emitting element 20. Likewise, second photocoupler 6 has a second light emitting element 22 for emitting a second light of second wavelength different from first wavelength of first light from first light emitting element 20 and a second light receiving element 23 adjacent to second light emitting element 22. First light emitting element 20 is apposed to first light receiving element 21 transversely to the transported direction of bill 64 and in alignment with second light receiving element 23 across passageway 13. Second light emitting element 22 is apposed to second light receiving element 23 transversely to the transported direction of bill 64 in alignment with first light receiving element 21 across passageway 13. First light receiving element 21 is located in alignment with second light emitting element 22 to selectively receive first light reflected on bill 64 from first light emitting element 20 and second light straight penetrating bill 64 from second light emitting element 22. Second light receiving element 23 is located in alignment with first light emitting element 20 to selectively receive second light reflected on bill 64 from second light emitting element 22 and first light straight going through bill 64 from first light emitting element 20. First light emitting element 20 preferably is an infrared ray LED, and second light emitting element 22 preferably is an LED for emitting the second light other than infrared ray, for example red light. In other words, while one of first and second lights may be an infrared ray, the other of first and second lights may be of the wavelength other than wavelength of infrared ray. First and second light emitting elements 20 and 22 are turned on at the different points in time from each other for time sharing control to prevent simultaneous reception of first and second lights by first or second light receiving element 21 or 23.

Figure 6:
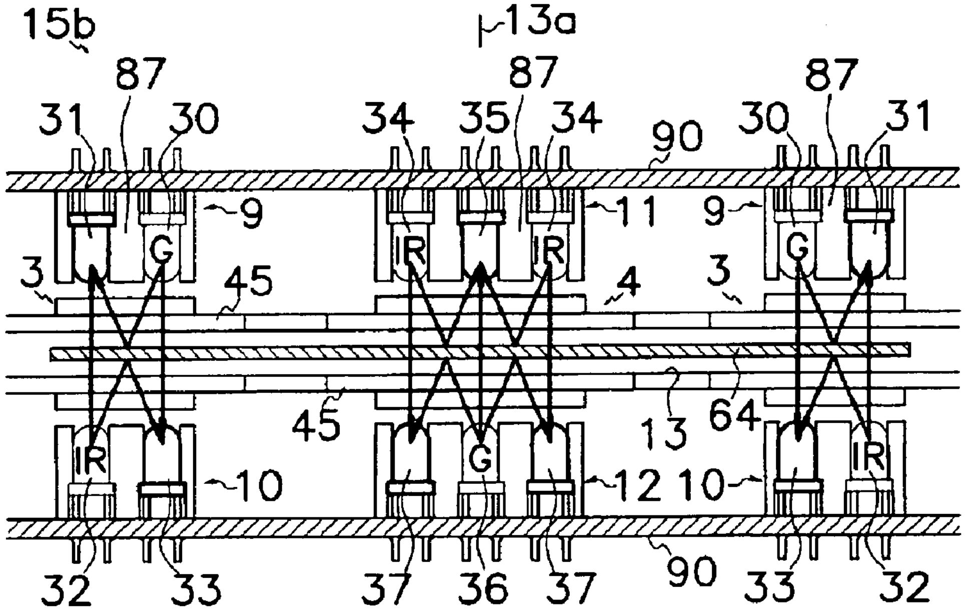
FIG. 6 is a sectional view showing rear assemblies of the optical sensing device.

As demonstrated in FIG. 6, rear sensing assembly 15*b* comprises a pair of outer sensing assemblies 3 and an inner sensing assembly 4 positioned laterally away from and between outer sensing assemblies 3. Each outer sensing assembly 3 comprises a third photocoupler 9 and a fourth photocoupler 10 positioned in the vicinity of and on the opposite sides of passageway 13 and in vertically spaced relation to each other across passageway 13. Third photocoupler 9 has a third light emitting element 30 for emitting a third light and a third light receiving element 31 disposed adjacent to third light emitting element 30. Likewise, fourth photocoupler 10 has a fourth light emitting element 32 for emitting a fourth light and a fourth light receiving element 33 disposed adjacent to fourth light emitting element 32. Third light emitting element 30 is apposed to third light receiving element 31 transversely to the transported direction of bill 64 and in alignment with fourth light emitting element 32 across passageway 13. Fourth light emitting element 32 is apposed to fourth light receiving element 33 transversely to the transported direction of bill 64 in alignment with third light emitting element 30 across passageway 13. Third light receiving element 31 is located in alignment with fourth light emitting element 32 to selectively receive third light reflected on bill 64 from third emitting element 30 and fourth light straight penetrating bill 64 from fourth light emitting element 32. Fourth light receiving element 33 is located in alignment with third light emitting element 30 to selectively receive fourth light reflected on bill 64 from fourth light emitting element 32 and third light straight going through bill 64 from third light emitting element 30. Fourth light emitting element 32 preferably is an infrared ray LED, and third light emitting element 30 preferably is an LED for emitting the fourth light other than infrared ray, for example green light. In other words, while one of third and fourth lights may be an infrared ray, the other of third and fourth lights may be of the wavelength other than wavelength of infrared ray. In any event, each of first, second, third and fourth lights can be selected from the group consisting of red, green, yellow, blue and ultraviolet lights and infrared ray. Third and fourth light emitting elements 30 and 32 are turned on at the different points in time from each other for time division control to prevent the simultaneous reception of the third and fourth lights by third and fourth light receiving elements 31 and 33.

In the shown embodiment, first and second photocoupers 5 and 6 form a first fourfold assembly, and third and fourth photocouplers 9 and 10 form a second fourfold assembly which is arranged longitudinally along passageway 13 behind the first fourfold assembly. FIGS. 5 and 6 show first, second, third and fourth triplex or threefold assemblies 7, 8, 11 and 12 each of which has three optical elements arranged in a line. First and second triplex assemblies 7 and 8 are positioned in the vicinity of and on the opposite sides of passageway 13 and in vertically spaced relation to each other across passageway 13. First triplex assembly 7 comprises two upper or first light emitting elements 24 for emitting first lights of the same or different wavelength from each other, and an upper or first light receiving element 25 positioned between first light emitting elements 24 in a line for receiving first and second lights reflected on bill 64 at the different points in time. For example, each of first light emitting elements 24 may be an LED for generating the same red light. Disposed in alignment with and beneath first triplex assembly 7 across passageway 13 is a second triplex assembly 8 which comprises two lower or second light receiving elements 27 and a lower or second light emitting element 26 disposed between two second light receiving elements 27 in a line for emitting a second light. For example, first light emitting elements 24 are red LEDs and second light emitting element 26 is an infrared ray LED. In this arrangement, first light receiving element 25 can receive first lights reflected on bill 64 from first light emitting elements 24 and second light straight penetrating bill 64 from second light emitting element 26. Each of second light receiving elements 27 can receive second light reflected on bill 64 from second light emitting element 26 and first light straight going through bill 64 from first light emitting element 24.

Third triplex assembly 11 comprises two upper or first light emitting elements 34 for emitting first lights of the same or different wavelength from each other, and an upper or first light receiving element 35 positioned between first light emitting elements 34 in a line for receiving first and second lights reflected on bill 64 at different points in time. For example, each of first light emitting elements 34 may be an LED for generating infrared ray. Disposed in alignment with and beneath third triplex assembly 11 across passageway 13 is a fourth triplex assembly 12 which comprises to lower or fourth light receiving elements 37 and a lower or fourth light emitting element 36 disposed between fourth light receiving elements 37 in a line for emitting a fourth light. For example, third light emitting elements are infrared ray LEDs and fourth light emitting element 36 is a green LED. In this arrangement, third light receiving element 35 can receive third lights reflected on bill 64 from third light emitting elements 34 and fourth light straight penetrating bill 64 from fourth light emitting element 36. Each of fourth light receiving elements 37 can receive fourth light reflected on bill 64 from fourth light emitting element 36 and third light passing through bill 64 from third light emitting element 34. First, second and third light emitting elements 24, 26, 34 and 36 are turned on at the different points in time.

Figure 7:
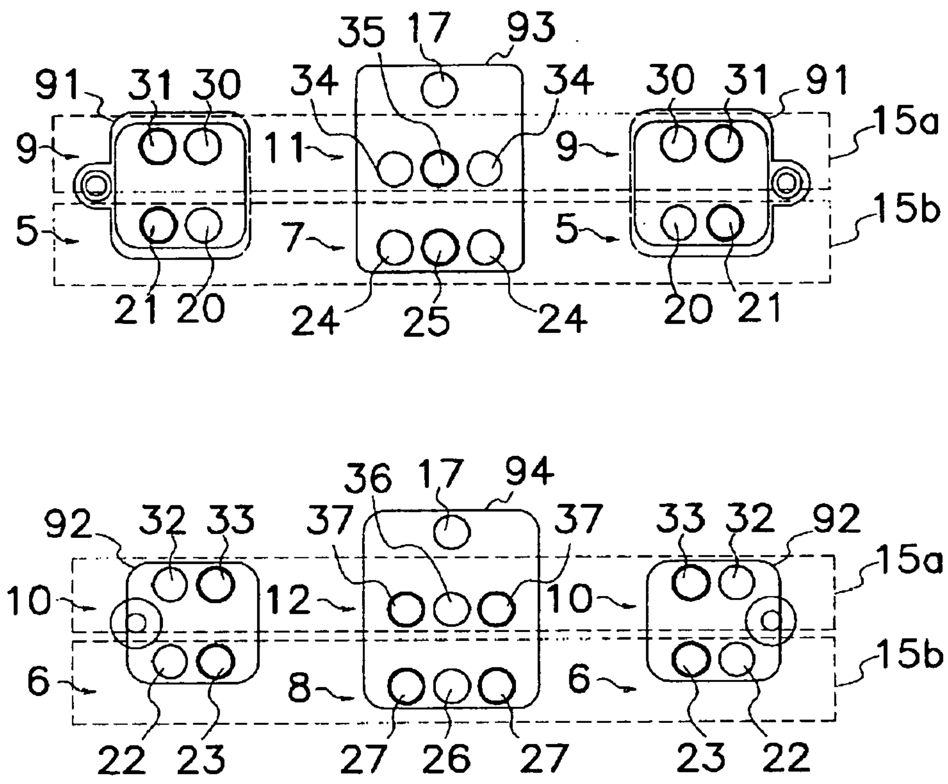
FIG. 7 is an enlarged plan view of the optical sensing device.

These light emitting elements and light receiving elements are LEDs may preferably be phototransistors, photodiodes or other photoelectric elements mounted on either of upper and lower printed boards 90 attached in frame 95. First, second, third and fourth triplex assemblies 7, 8, 11 and 12 are attached along a central axis 13*a* of passageway 13, and first, second, third and fourth photocouplers 5, 6, 9 and 10 are attached in the symmetric or mirror imaged positions with respect to the central axis 13*a*. A pair of spacers 45 made of light permeable material such as transparent resin are positioned between upper and lower light emitting and receiving elements. For example, spacers 45 may be of an elongated plate or cylindrical lens. As shown in FIG. 7, light emitting elements 20, 30 and light receiving elements 21, 31 are located in an upper case 91 with a partition 87 for keeping light emitting elements 20, 30 and light receiving elements 21, 31 in an appropriately spaced relation to each other. Likewise, light emitting elements 22, 32 and light receiving elements 23, 33 are located in a lower case 92 with a partition 87 for keeping light emitting elements 22, 32 and light receiving elements 23, 33 in an appropriately spaced relation to each other. Light emitting elements 24, 34 and light receiving elements 25, 35 are located in an upper case 93 together with thread sensor 17 with partitions 87 for keeping these elements in an appropriately spaced relation to each other. Similarly, light emitting elements 26, 36 and light receiving elements 27, 37 are located in a lower case 94 together with thread sensor 17 with partitions 87 for keeping these elements in an appropriately spaced relation to each other.

As mentioned above, in the first embodiment of the present invention for combining two light emitting elements and two light receiving elements, the sensing device comprises a first photocoupler 5 or 9 and a second photocoupler 6 or 10 disposed in the proximity to and on the opposite sides of passageway 13. First photocoupler 5 or 9 comprises a first light emitting element 20 or 30 for emitting a first light, and a first light receiving element 21 or 31 disposed in the vicinity of first light emitting element 20 or 30. Second photocoupler 6 or 10 comprises a second light emitting element 22 or 32 for emitting a second light of the light wavelength different from that of the first light, and a second light emitting element 23 or 33. First light receiving element 21 or 31 can receive first light reflected on bill 64 from first light emitting element 20 or 30, and second light straight penetrating bill 64 from second light emitting element 22 or 32. Second light receiving element 23 or 33 can receive second light reflected on bill 64 from second light emitting element 22 or 32, and first light straight going through bill 64 from first light emitting element 20 or 30. Accordingly, combination of first photocoupler 5 or 9 and second photocoupler 6 or 10 can pick up four kinds of optical features or patterns of bill 64 inclusive of two penetration light characteristics and two reflection light characteristics, reducing the number of light emitting and receiving elements.

Figure 8:
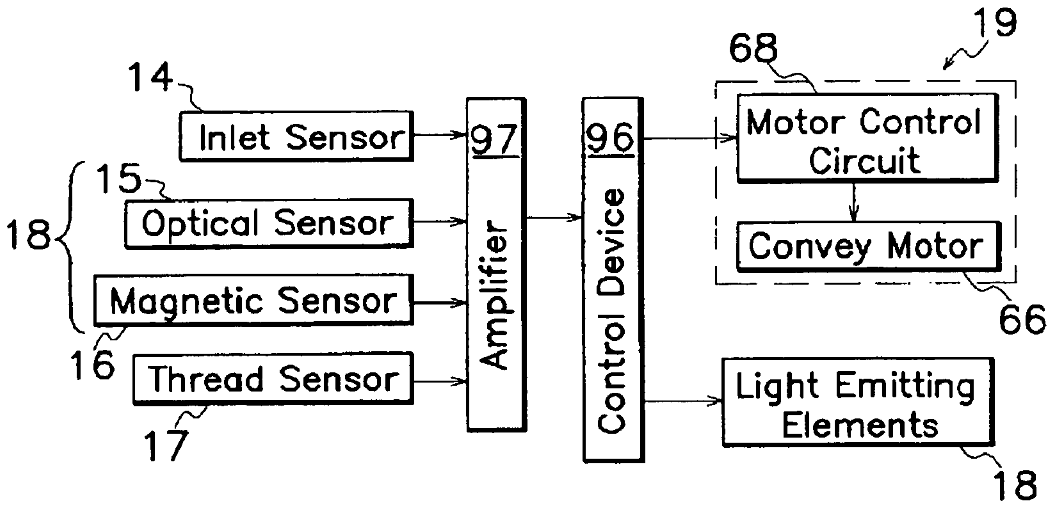
FIG. 8 shows an electric circuit of the bill validator.
Figure 9:
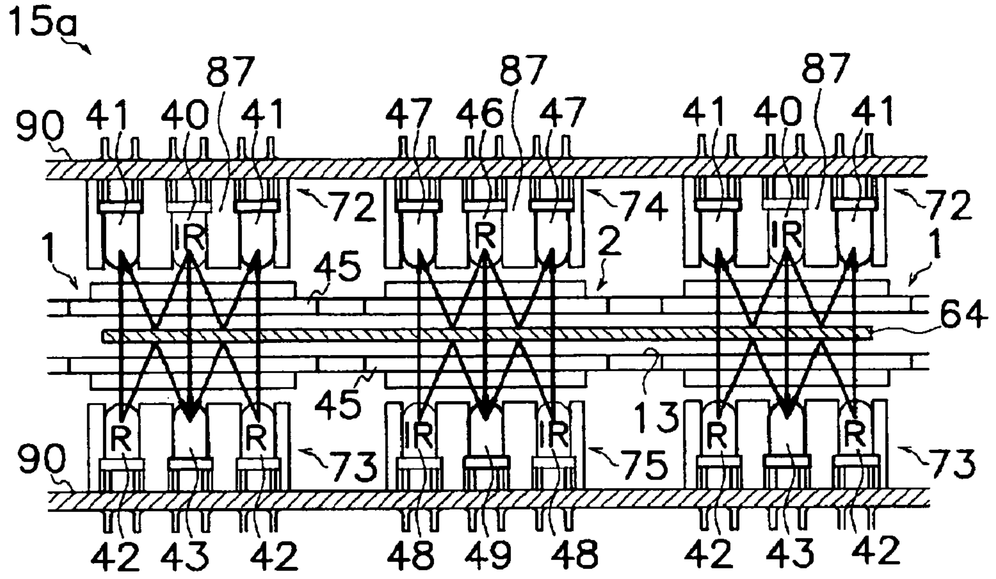
FIG. 9 is a sectional view of another embodiment of front assemblies of the optical sensing device.
Figure 10:
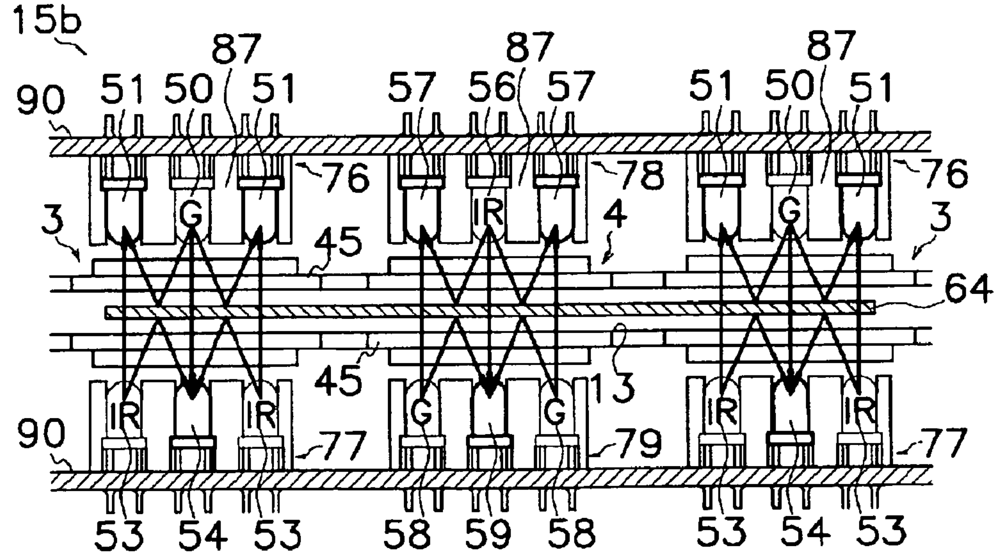
FIG. 10 is a sectional view of rear assemblies of the optical sensing device shown in FIG. 9.

FIGS. 9 and 10 exemplify another embodiment of a sensing device 18 that has front and rear sensing assemblies 15*a*, 15*b*. As shown in FIG. 8, front sensing assembly 15*a* comprises a pair of outer sensing assemblies 1 and an inner sensing assembly 2 positioned between and in laterally spaced relation to outer sensing assemblies 1. Each outer sensing assembly 1 comprises first and second triplex assemblies 72 and 73 positioned adjacent to and in vertically spaced relation to each other across passageway 13. First triplex assembly 72 comprises a first light emitting element 40 for emitting a first light and a pair of first light receiving elements 41 disposed in the proximity to first light emitting element 40. Second triplex assembly 73 comprises a pair of second light emitting elements 42 for emitting second lights and a second light receiving element 43 disposed in the proximity to and between second light emitting elements 42. First light emitting element 40 and first light receiving elements 41 are attached to upper printed board 90 in alignment with respectively second light receiving element 43 and second light emitting elements 42 attached to lower printed board 90 so that each of first light receiving elements 41 can receive first light reflected on bill 64 from first light emitting element 40 and second light straight penetrating bill 64 from second light emitting element 42, and second light receiving element 43 can receive first light straight passing through bill 64 from first light emitting element 40 and both second lights reflected on bill 64 from two second light emitting elements 42. For example, first light emitting element 40 may be an LED of infrared ray, second light emitting elements 42 may be red LEDs, and light receiving elements may be phototransistors.

Inner sensing assembly 2 comprises first and second triplex assemblies 74 and 75 positioned adjacent to and in vertically spaced relation to each other across passageway 13. First triplex assembly 74 comprises a first light emitting element 46 for emitting a first light, and two first light receiving elements 47 disposed in the proximity to and on the opposite sides of first light emitting element 46. Second triplex assembly 75 comprises two second light emitting elements 48 for emitting second lights and a second light receiving element 49 disposed in the proximity to and between second light emitting elements 48. First light emitting element 46 and first light receiving elements 47 are attached to upper printed board 90 in alignment with respectively second light receiving element 49 and second light emitting elements 48 attached to lower printed board 90 so that each of first light receiving elements 47 can receive first light reflected on bill 64 from first light emitting element 46 and second light straight penetrating bill 64 from second light emitting element 48, and second light receiving element 49 can receive first light straight going through bill 64 from first light emitting element 46 and both second lights reflected on bill 64 from two second light emitting elements 48. For example, first light emitting element 46 may be a red LED second light emitting elements 48 may be LEDs of infrared ray, and light receiving elements may be phototransistors.

As shown in FIG. 10, rear sensing assembly 15*b* comprises a pair of outer sensing assemblies 3 and an inner sensing assembly 4 positioned between and in laterally spaced relation to outer sensing assemblies 3. Each outer sensing assembly 3 comprises first and second triplex assemblies 76 and 77 positioned adjacent to and in vertically spaced relation to each other across passageway 13. First triplex assembly 76 comprises a first light emitting element 50 for emitting a first light and a pair of first light receiving elements 51 disposed in the proximity to first light emitting element 50. Second triplex assembly 77 comprises a pair of second light emitting elements 53 for emitting second lights and a second light receiving element 54 disposed in the proximity to and between second light emitting elements 53. First light emitting element 50 and first light receiving elements 51 are attached to upper printed board 90 in alignment with respectively second light receiving element 54 and second light emitting elements 53 attached to lower printed board 90 so that each of first light receiving elements 51 can receive first light reflected on bill 64 from first light emitting element 50 and second light straight penetrating bill 64 from second light emitting element 53, and second light receiving element 54 can receive first light straight going through bill 64 from first light emitting element 50 and both second lights reflected on bill 64 from two second light emitting elements 53. For example, first light emitting element 50 may be a green LED, second light emitting elements 53 may be LEDs of infrared ray, and light receiving elements may be phototransistors.

Inner sensing assembly 4 comprises first and second triplex assemblies 78 and 79 positioned adjacent to and in vertically spaced relation to each other across passageway 13. First triplex assembly 78 comprises a first light emitting element 56 for emitting a first light, and two first light receiving elements 57 disposed in the proximity to and on the opposite sides of first light emitting element 56. Second triplex assembly 79 comprises a pair of second light emitting elements 58 for emitting second lights and a second light receiving element 59 disposed in the proximity to and between second light emitting elements 58. First light emitting element 56 and first light receiving elements 57 are attached to upper printed board 90 in alignment with respectively second light receiving element 59 and second light emitting elements 58 attached to lower printed board 90 so that each of first light receiving elements 57 can receive first light reflected on bill 64 from first light emitting element 56 and second light straight penetrating bill 64 from second light emitting element 58, and second light receiving element 59 can receive first light penetrating bill 64 from first light emitting element 56 and both second lights reflected on bill 64 from two second light emitting elements 58. For example, first light emitting element 56 may be an LED of infrared ray, second light emitting elements 58 may be green LEDs, and light receiving elements may be phototransistors.

As above-mentioned, in the second embodiment of the present invention, the optical sensing device comprises first triplex assemblies 7, 11, 72, 74, 76 and 78 and second triplex assemblies 8, 12, 73, 75, 77 and 79, one of which comprises a pair of outer light emitting elements 24, 34, 42, 48, 53 and 58 and inner light receiving elements 25, 35, 43, 49, 54 and 59 positioned between the pair of outer light emitting elements 24, 34, 42, 48, 53 and 58, and the other of which comprises a pair of outer light receiving elements 27, 37, 41, 47, 51 and 57 and inner light emitting elements 26, 36, 40, 46, 50 and 56 positioned between the pair of outer light receiving elements 27, 37, 41, 47, 51 and 57 for emitting lights of light wavelengths different from those of outer light emitting elements 24, 34, 42, 48, 53 and 58.

Inner light receiving elements 25, 35, 43, 49, 54 and 59 can receive lights reflected on bill 64 from outer light emitting elements 24, 34, 42, 48, 53 and 58, and lights straight penetrating bill 64 from inner light emitting elements 26, 36, 40, 46, 50 and 56. Each of outer light receiving elements 27, 37, 41, 47, 51 and 57 can receive lights reflected on bill 64 from inner light emitting elements 26, 36, 40, 46, 50 and 56, and lights straight going through bill 64 from outer light emitting elements 24, 34, 42, 48, 53 and 58. Combination of first triplex assemblies 7, 11, 72, 74, 76 and 78 and second triplex assemblies 8, 12, 73, 75, 77 and 79 can take out seven kinds of optical features or patterns of bill 64 inclusive of three penetration light characteristics and four reflection light characteristics, reducing the number of light emitting and receiving elements.

A pair of outer light emitting elements 24, 34, 42, 48, 53 and 58 of first triplex assembly 7, 11, 72, 74, 76 and 78 and an inner light emitting element 26, 36, 40, 46, 50 and 56 of second triplex assembly 8, 12, 73, 75, 77 and 79 can be selected from the group consisting of LEDs for producing infrared ray and light of wavelength other than infrared ray. Inner light receiving element 25, 35, 43, 49, 54 and 59 can receive lights reflected on bill 64 from the pair of outer light emitting elements 24, 34, 42, 48, 53 and 58 of first triplex assembly 7, 11, 72, 74, 76 and 78 and second light straight penetrating bill 64 from inner light emitting element 26, 36, 40, 46, 50 and 56. The pair of outer light receiving elements 27, 37, 41, 47, 51 and 57 can receive lights straight penetrating bill 64 from the pair of outer light emitting elements 24, 34, 42, 48, 53 and 58 of first triplex assembly 7, 11, 72, 74, 76 and 78, and lights reflected on bill 64 from inner light emitting element 26, 36, 40, 46, 50 and 56 of second triplex assembly 8, 12, 73, 75, 77 and 79.

Light emitting and receiving elements in each triplex assembly are arranged in a line perpendicular to the direction for moving bill 64. First triplex assembly 7, 11, 72, 74, 76 and 78 is disposed in a laterally spaced relation to first photocoupler 5 or 9, and second triplex assembly 8, 12, 73, 75, 77 and 79 is disposed in a laterally spaced relation to second photocoupler 6 or 10 to form a combined structure of a fourfold assembly that comprises two light emitting elements and two light receiving elements and a sixfold assembly that comprises three light emitting elements and three light receiving elements. Outer light emitting elements 24, 34, 42, 48, 53 and 58 and inner light emitting elements 26, 36, 40, 46, 50 and 56 are turned on at different points in time from each other for time sharing control to avoid receiving overlapped lights emitted from different light emitting elements.

As shown in FIG. 8, inlet sensor 14, optical sensing device 15, magnetic sensing device 16 and thread sensor 17 are connected to input terminals of control device 96 through an amplifier 97, and output terminals of control device 96 are connected to light emitting elements of sensing device 18 and motor control circuit 68 of conveyor 19 for activating convey motor 66.

In operating the bill validator, a bill 64 is inserted into inlet 60, and inlet sensor 14 detects insertion of bill 64 to produce a detection signal to control device 96 that then forwards drive signals to motor control circuit 68 to rotate convey motor 66. Thus, bill 64 is transported by convey belts 39 into and along passageway 13, and sensing device 18 is activated when bill 64 passes sensing device 18. Accordingly, light emitting elements 20, 22, 24, 26, 30, 32, 34, 36, 40, 42, 46, 48, 50, 53, 56 and 58 are turned on if they are disposed in the same case 91, 92, 93 and 94 to avoid undesirable optical interference by simultaneous light emission. Plural optical features of bill 64 are converted into electric signals by light receiving element 21, 23, 25, 27, 31, 33, 35, 37, 41, 43, 47, 49, 51,54, 57 and 59 that receive any light emitted from light emitting elements 20, 22, 24, 26, 30, 32, 34, 36, 40, 42, 46, 48, 50, 53, 56 and 58 so that the electric signals are supplied to control device 96. When infrared ray penetrates bill 64, it can be received by a light receiving element with less impact by colored ink printed on bill 64 but with impact by paper quality of bill 64, and therefore, received infrared ray can provide reference or basic light data for detecting a light amount level of light other than infrared ray, such as red, green, yellow, blue or ultraviolet light. In this case, difference between received light amounts of infrared ray and light other than infrared ray provides good optical data without influence by paper quality of bill 64. Control device 96 discriminates authenticity of bill 64 in view of the received detection signals, and further drives conveyor 19 to discharge bill 64 to accumulate it in a stacking chamber 44 when control device 96 determines bill 64 as genuine. Adversely, when control device 96 does not determine bill 64 as genuine, it drives conveyor 19 in the reverse direction to return bill 64 to inlet 60.

Figure 11:
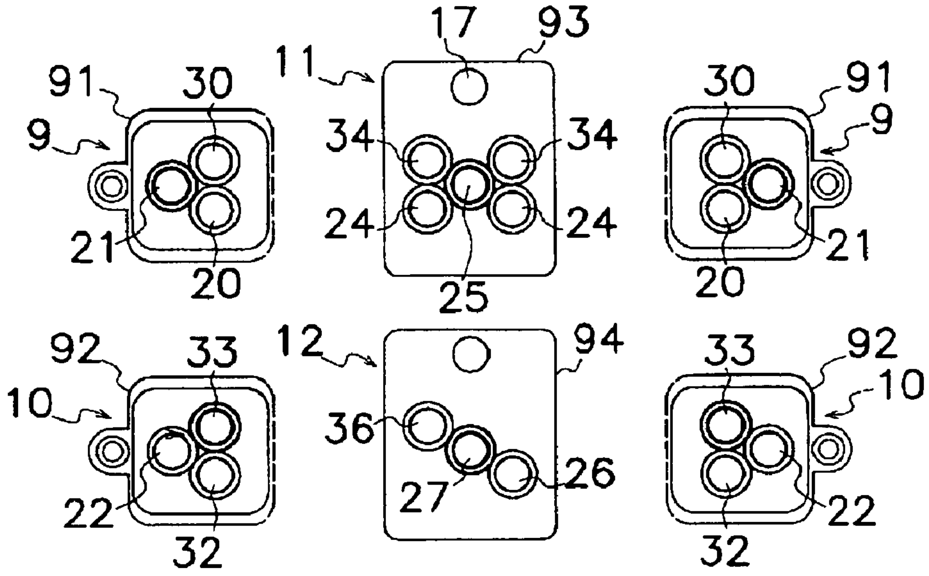
FIG. 11 is an enlarged plan view showing a varied embodiment of the optical sensing device of FIG. 7 with omission of light receiving elements.
Figure 12:
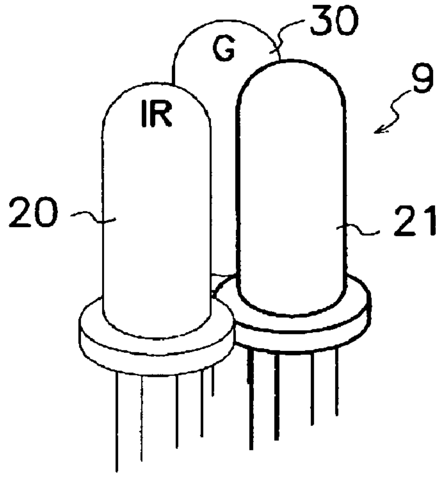
FIG. 12 is an exploded perspective view of a triplex assembly shown in FIG. 11.
Figure 13:
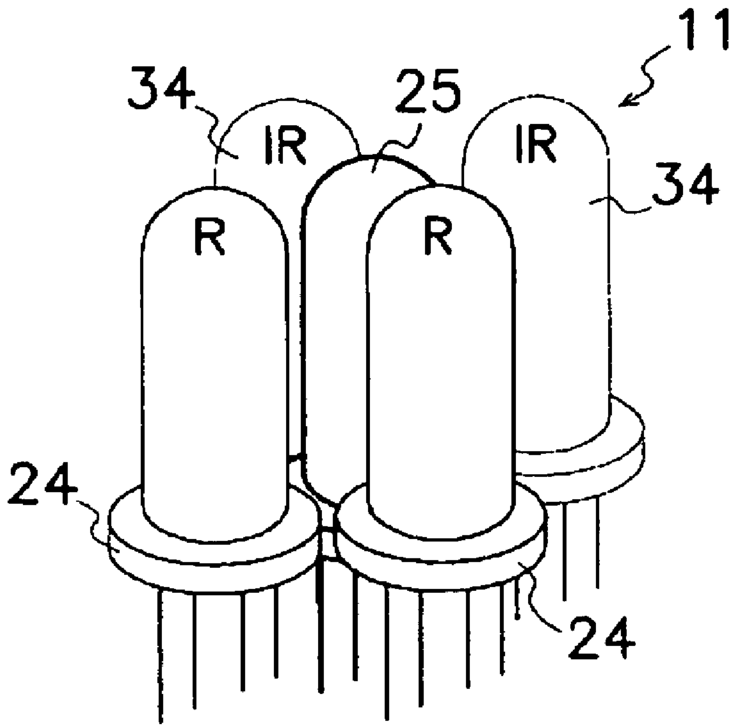
FIG. 13 is an exploded perspective view of a fivefold assembly shown in FIG. 11.
Figure 14:
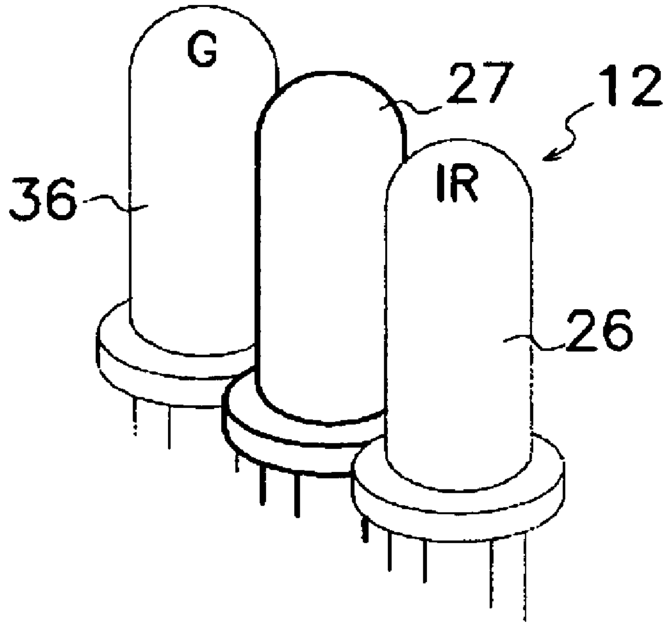
FIG. 14 is an exploded perspective view of another triplex assembly shown in FIG. 11.

The above-mentioned embodiments of the invention may be varied in various ways. For example, the optical sensing device may comprise three or three pairs of photocouplers in lieu of a pair of first and second photocouplers 5 and 6 or 9 and 10, or three or three pairs of triplex assemblies. As shown in FIG. 11, light receiving element 31 can be removed from case 91 with light emitting elements 20, 30 and light receiving element 21 positioned at vertexes of a plane triangle as shown in FIG. 12, and light receiving element 23 can be removed from case 92. Also, light receiving element 35 can be removed from case 93 as shown in FIG. 13, light receiving element 37 can be removed from case 94 to mount a single light receiving element 27 and light emitting elements 26 and 36 in case 94 as shown in FIG. 12. Positions and combination of photocouplers and triplex assemblies can be selected as required. It should be noted that the present invention can also be applied to valuable papers such as bonds, certificates, coupons, scrip, currency, banknotes, paper money, tickets other than bills.

What is claimed is:

1. An optical sensing device for detecting optical features of valuable papers, comprising first and second photocouplers positioned in the vicinity of and on the opposite sides of a passageway for guiding the valuable paper;

wherein the first photocoupler comprises an upper case, a first light emitting element located in the upper case for emitting a first light of a first wavelength, and a first light receiving element located in the upper case adjacent to the first light emitting element;

the upper case has a partition for keeping the first light emitting element and first light receiving element in an appropriately spaced relation to each other;

the second photocoupler comprises a lower case, a second light emitting element located in the lower case for emitting a second light of a second wavelength different from the first wavelength of the first light emitted from the first light emitting element, and a second light receiving element located in the lower case adjacent to the second light emitting element;

the lower case has a partition for keeping the second light emitting element and second light receiving element in an appropriately spaced relation to each other;

the first light receiving element receives the first light from the first light emitting element reflected on the valuable paper and the second light from the second light emitting element penetrating the valuable paper;

the second light receiving element receives the second light from the second light emitting element reflected on the valuable paper and the first light from the first light emitting element penetrating the valuable paper;

one of the first and second lights is an ultraviolet ray, and the other of the first and second lights has a wavelength other than a wavelength of the ultraviolet ray; and the ultraviolet ray received by the first or second light receiving element provides reference or basic light data for detecting a light amount level of light other than the ultraviolet ray.

2. The optical sensing device of claim 1, wherein the partitions extend to at least distal ends of the first and second light emitting elements and the first and second light receiving elements.

3. The optical sensing device of claim 1, wherein further comprising upper and lower printed boards attached in a frame and in parallel to the passageway;

the first light emitting element and the first light receiving element attach to the upper printed board; and the second light emitting element and the second light receiving element attach to the lower printed board.

4. The optical sensing device of claim 1, wherein the first light emitting element is apposed to the first light receiving element transversely to the transported direction of the valuable paper and in alignment with the second light receiving element across the passageway; and the second light emitting element is apposed to the second light receiving element transversely to the transported direction of the valuable paper in alignment with the first light receiving element across the passageway.

5. The optical sensing device of claim 1, wherein the other of the first and second lights are selected from the group consisting of red, green, yellow, blue and infrared lights.

6. The optical sensing device of claim 1, wherein the first and second light emitting elements are turned on at different points in time from each other.

7. The optical sensing device of claim 1, wherein the first and second light emitting elements are turned on at different points in time from each other to prevent the first and second light receiving elements from simultaneously receiving the first and second lights.

8. An optical sensing device for detecting optical features of valuable papers, comprising first and second fourfold assemblies longitudinally arranged before and behind along a passageway for guiding the transported valuable paper;

the first fourfold assembly comprising first and second photocouplers positioned in the vicinity of and on the opposite sides of the passageway;

the second fourfold assembly comprising third and fourth photocouplers positioned in the vicinity of and on the opposite sides of the passageway;

wherein the first and third photocouplers are arranged in a vertically spaced relation to and in alignment to respectively the second and fourth photocouplers;

the first photocoupler comprises a first light emitting element for emitting a first light, and a first light receiving element adjacent to the first light emitting element;

the second photocoupler comprises a second light emitting element for emitting a second light of the wavelength different from that of the first light, and a second light receiving element adjacent to the second light emitting element;

the third photocoupler comprises a third light emitting element for emitting a third light, and a third light receiving element adjacent to the third light emitting element;

the fourth photocoupler comprises a fourth light emitting element for emitting a fourth light of the wavelength different from that of the third light, and a fourth light receiving element adjacent to the fourth light emitting element;

the first light receiving element receives the first light from the first light emitting element reflected on the valuable paper and the second light from the second light emitting element penetrating the valuable paper;

the second light receiving element receives the second light from the second light emitting element reflected on the valuable paper and the first light from the first light emitting element penetrating the valuable paper;

the third light receiving element receives the third light from the third light emitting element reflected on the valuable paper and the fourth light from the fourth light emitting element penetrating the valuable paper;

the fourth light receiving element receives the fourth light from the fourth light emitting element reflected on the valuable paper and the third light from the third light emitting element penetrating the valuable paper;

at least one of the first, second, third and fourth lights is an ultraviolet ray; and the ultraviolet ray received by the first, second, third or fourth receiving element provides reference or basic light data for detecting a light amount level of the light other than the ultraviolet ray.

9. The optical sensing device of claim 8, wherein the lights other than the ultraviolet ray are selected from the group consisting of red, green, yellow, blue and infrared lights.

10. The optical sensing device of claim 8, wherein one of the first and second lights and one of the third and fourth lights are ultraviolet rays; and the other of the first and second lights and the other of the third and fourth lights have the wavelength other than a wavelength of the ultraviolet ray different from each other.

11. The optical sensing device of claim 8, wherein the first and second light emitting elements are turned on at different points in time from each other; and the third and fourth light emitting elements are turned on at different points in time from each other.

12. The optical sensing device of claim 8, wherein the first and second light emitting elements are turned on at different points in time from each other to prevent the first and second light receiving elements from simultaneously receiving the first and second lights; and the third and fourth light emitting elements are turned on at different points in time from each other to prevent the third and fourth light receiving elements from simultaneously receiving the third and fourth lights.

13. The optical sensing device of claim 8, wherein the first photocoupler is disposed in a vertically spaced relation to the second photocoupler across the passageway; and the third photocoupler is disposed in a vertically spaced relation to the fourth photocoupler across the passageway.

14. An optical sensing device for detecting optical features of valuable papers, comprising first and second fourfold assemblies longitudinally arranged before and behind along a passageway for guiding the transported valuable paper;

the first fourfold assembly comprising first and second photocouplers positioned in the vicinity of and on the opposite sides of the passageway;

the second fourfold assembly comprising third and fourth photocouplers positioned in the vicinity of and on the opposite sides of the passageway;

wherein the first photocoupler comprises an upper case, a first light emitting element located in the upper case for emitting a first light, and a first light receiving element located in the upper case adjacent to the first light emitting element;

the upper case has a partition for keeping the first light emitting element and first light receiving element in an appropriately spaced relation to each other;

the second photocoupler comprises a lower case, a second light emitting element located in the lower case for emitting a second light of the wavelength different from that of the first light, and a second light receiving element located in the lower case adjacent to the second light emitting element;

the lower case has a partition for keeping the second light emitting element and second light receiving element in an appropriately spaced relation to each other;

the third photocoupler comprises an upper case, a third light emitting element located in the upper case for emitting a third light, and a third light receiving element located in the upper case adjacent to the third light emitting element;

the upper case has a partition for keeping the third light emitting element and third light receiving element in an appropriately spaced relation to each other;

the fourth photocoupler comprises a lower case, a fourth light emitting element located in the lower case for emitting a fourth light of the wavelength different from that of the third light, and a fourth light receiving element located in the lower case adjacent to the fourth light emitting element;

the lower case has a partition for keeping the fourth light emitting element and fourth light receiving element in an appropriately spaced relation to each other;

the first light receiving element receives the first light from the first light emitting element reflected on the valuable paper and the second light from the second light emitting element penetrating the valuable paper;

the second light receiving element receives the second light from the second light emitting element reflected on the valuable paper and the first light from the first light emitting element penetrating the valuable paper;

the third light receiving element receives the third light from the third light emitting element reflected on the valuable paper and the fourth light from the fourth light emitting element penetrating the valuable paper;

the fourth light receiving element receives the fourth light from the fourth light emitting element reflected on the valuable paper and the third light from the third light emitting element penetrating the valuable paper, at least one of the first, second, third and fourth lights is an ultraviolet ray; and the ultraviolet ray received by the first, second, third or fourth receiving element provides reference or basic light data for detecting a light amount level of the light other than the ultraviolet ray.

15. The optical sensing device of claim 14, wherein the partitions extend to at least distal ends of the first, second, third and fourth light emitting elements and the first, second, third and fourth light receiving elements.

16. The optical sensing device of claim 14, wherein further comprising upper and lower printed boards attached in a frame and in parallel to the passageway;

the first and third light emitting elements and the first and third light receiving elements attach to the upper printed board; and the second and fourth light emitting elements and the second light and fourth receiving elements attach to the lower printed board.

17. The optical sensing device of claim 8 or 14, wherein the first light emitting element is apposed to the first light receiving element transversely to the transported direction of the valuable paper and in alignment with the second light receiving element across the passageway;

the second light emitting element is apposed to the second light receiving element transversely to the transported direction of the valuable paper in alignment with the first light receiving element across the passageway;

the third light emitting element is apposed to the third light receiving element transversely to the transported direction of the valuable paper and in alignment with the fourth light receiving element across the passageway; and the fourth light emitting element is apposed to the fourth light receiving element transversely to the transported direction of the valuable paper in alignment with the third light receiving element across the passageway.

* * * * *